United States Patent
Luck, Jr. et al.

[11] 3,941,973
[45] Mar. 2, 1976

[54] LASER MATERIAL REMOVAL APPARATUS

[75] Inventors: Clarence F. Luck, Jr., Waltham; Colin Bowness, Weston, both of Mass.

[73] Assignee: Raytheon Company, Lexington, Mass.

[22] Filed: June 26, 1974

[21] Appl. No.: 483,338

[52] U.S. Cl. ............................ 219/121 L; 350/96 T
[51] Int. Cl.² ...................................... B23K 26/00
[58] Field of Search ................ 219/121 L, 121 LM; 331/94.5 C, DIG. 1; 350/96 T, 299, 286, 9 F, 102, 103, 96 WG, 202, 288

[56] References Cited
UNITED STATES PATENTS

| | | | |
|---|---|---|---|
| 3,236,707 | 2/1966 | Lins | 219/121 LM X |
| 3,534,462 | 10/1970 | Cruckshank et al. | 219/121 LM |
| 3,536,434 | 10/1970 | Frank | 350/96 T X |
| 3,560,875 | 2/1971 | Macken | 331/94.5 C |
| 3,597,579 | 8/1971 | Lumley | 219/121 L |
| 3,601,480 | 8/1971 | Randall | 350/96 T X |
| 3,610,755 | 10/1971 | Wieberger et al. | 350/96 WG X |
| 3,628,861 | 12/1971 | Goubau | 350/96 WG |
| 3,693,515 | 9/1972 | Baker | 350/96 T X |
| 3,740,112 | 6/1973 | Lundgren | 350/96 T |
| 3,760,174 | 9/1973 | Boenning et al. | 350/96 T X |
| 3,817,605 | 6/1974 | Franklin et al. | 350/288 X |

*Primary Examiner*—J. V. Truhe
*Assistant Examiner*—G. R. Peterson
*Attorney, Agent, or Firm*—Harold A. Murphy; Joseph D. Pannone; John T. Meaney

[57] ABSTRACT

A laser material removal apparatus and method of removing material from a workpiece wherein a laser forms a beam of radiation having a substantially circular cross-sectional configuration, and optical means is provided for compressing portions of the beam so that the resultant focused beam will provide an image of substantially rectangular shape and uniform energy whereby improved control of the size and shape of the area to be removed is obtained.

7 Claims, 8 Drawing Figures

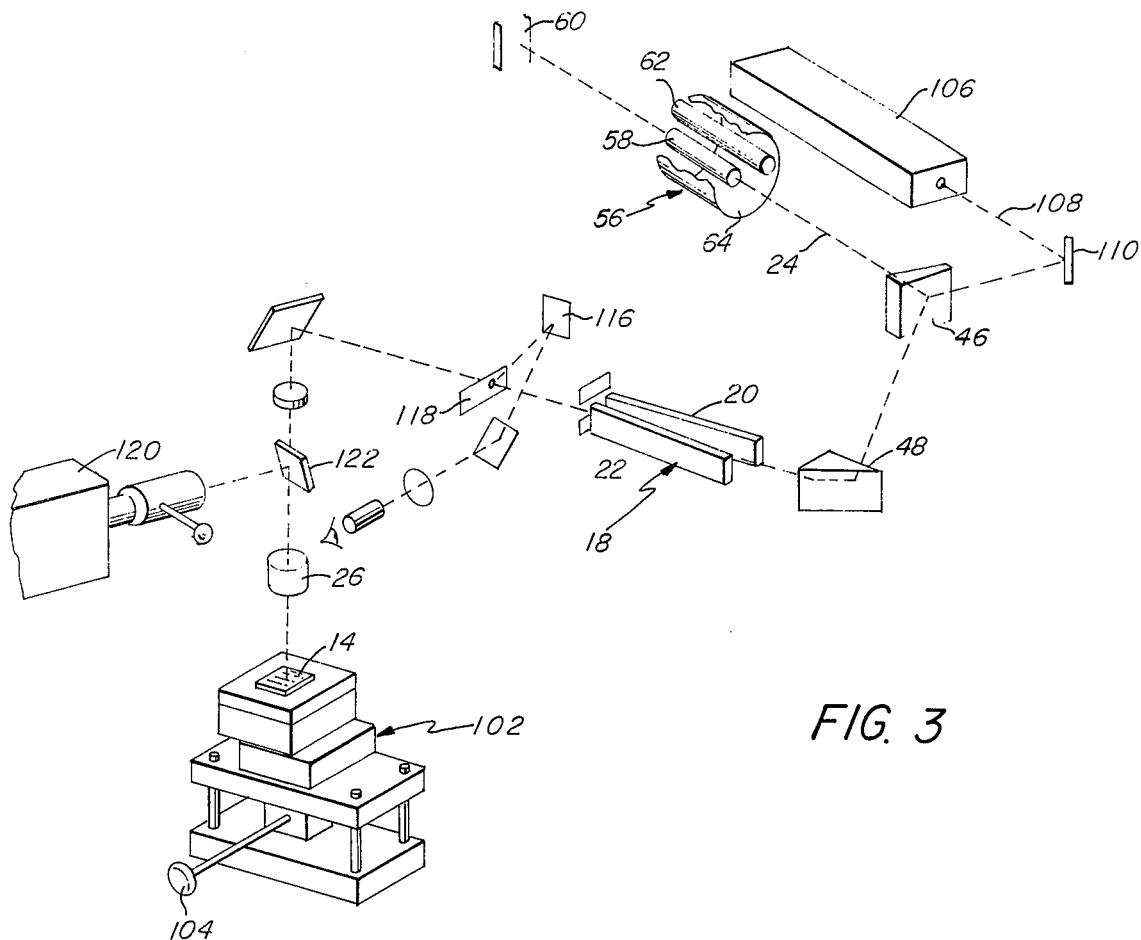
FIG. 3
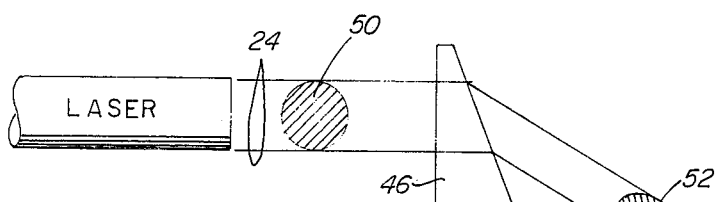
FIG. 4
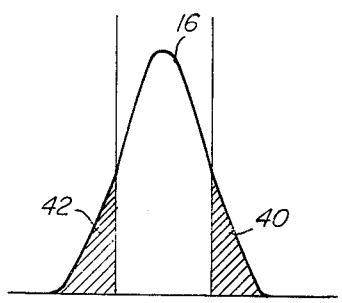
FIG. 5
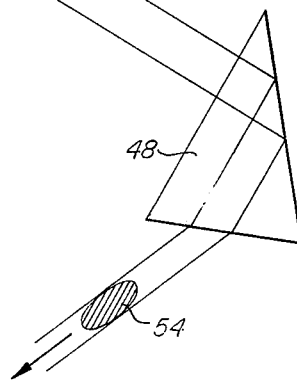
TO COMPRESSOR DEVICE, 18

LASER MATERIAL REMOVAL APPARATUS

BACKGROUND OF THE INVENTION

It has become common practice to employ lasers in various manufacturing processes where it is necessary to remove material, such as in drilling, for example. In the fabrication of devices such as microcircuits, for example, resistor trimming is often done by utilization of a laser beam, as is material removal in the formation of circuit runs, for example.

Known lasing devices such as ruby or YAG crystals, produce a highly intense beam of coherent electromagnetic radiation. Since the crystal is of a solid cylindrical shape and since the beam of radiation exits from one end of the crystal, the beam has a substantially circular cross-sectional configuration. While a beam having such a cross-sectional shape is extremely useful for many material removal applications, it is often highly desirable that the beam have a rectangular cross-sectional shape. For example, for critical removal of material from a selected area of a microcircuit a round or elliptical beam may not prove satisfactory. One example is a memory device where fusible links are provided and where selected ones of such links must be "blown" to isolate components of the device. In such cases, a round or elliptical beam of small size may burn away a portion of a link but in doing so may damage an adjacent surface area of the device or, if extremely small, may burn away a portion of the link while still leaving portions of the link so closely adjacent to one another as to continue to permit undesirable electrical interconnection.

It has been found possible to alter the cross-sectional shape of a beam of electromagnetic radiation from round or elliptical to rectangular in many ways. This can be done electronically or optically. However, all known methods have proved undesirable for several reasons such as poor quality or definition of shape, loss of radiation energy, or uneven distribution of energy. One of the better known methods has been to direct the beam through an aperture in an opaque plate where the aperture has a configuration conforming to the desired cross-sectional shape of the beam. In this method a considerable quantity of radiation is lost because portions of the beam necessarily impinge upon and are intercepted by the opaque portions of the plate.

In a known prior art system a quasi rectangular beam shape has been created by pairs of cylindrical lens elements emitting an extreme astigmatic imaging. However, in such a system it has been found to be extremely difficult to determine before the actual material removal process where the resultant rectangular image falls. This prevents ready use of coaxial closed circuit television viewing and personal ocular viewing arrangements.

SUMMARY OF THE INVENTION

The above and other objections to prior art devices or systems of the character described are overcome by the present invention wherein means is provided for altering the cross-sectional shape of a laser output beam of radiation in a manner whereby a resultant rectangular image is produced which contains substantially all of the energy generated in the initial unaltered beam without any substantial loss, and which further contains a more uniform distribution of energy density throughout the image than is provided in the initially formed beam. Furthermore, coaxial viewing, television and other optical appurtenances may be readily utilized as desired.

This is achieved by providing an adjustable beam compressor such as a pair of long flat mirrors or thin wedge prisms which are spaced to provide an arrangement into which the beam is directed. Opposed sides of the beam will be reflected with the mirror arrangement toward the exit end while the central portion of the beam will emerge unattenuated. Thus the beam will be separated into at least three portions which are thereafter focused by a suitable lens onto an image plane where the portions representing the side portions of the initial beam will be superimposed on the central portion, thus producing an extremely narrowed, relatively rectangular image. Thus a substantially rectangular image of the laser beam is produced which contains substantially all of the beam energy and is much more uniform in density throughout its area.

Slit means may be provided at the exit end of the compressor for controlling the length of the image, and prisms may be used between the laser and the compressor for initially compressing the beams so that smaller compressor elements may be used.

This system enables optical on-axis viewing to be employed and on-axis superimposing of reticles and the like. Furthermore, it is well adapted for use with television camera and monitor controls.

BRIEF DESCRIPTION OF THE DRAWING

Other objectives and advantages of the invention will become apparent from the following description taken in connection with the accompanying drawings, wherein:

FIG. 3 is a schematic diagram of the entire optical portion of the apparatus shown in FIG. 1;

FIG. 4 is a diagrammatic illustration of means for partial compression of a laser beam before entering the compressor unit;

FIG. 5 is a curve illustrating radiation intensity output from a laser rod;

DESCRIPTION OF THE PREFERRED EMBODIMENT

Figure 1:
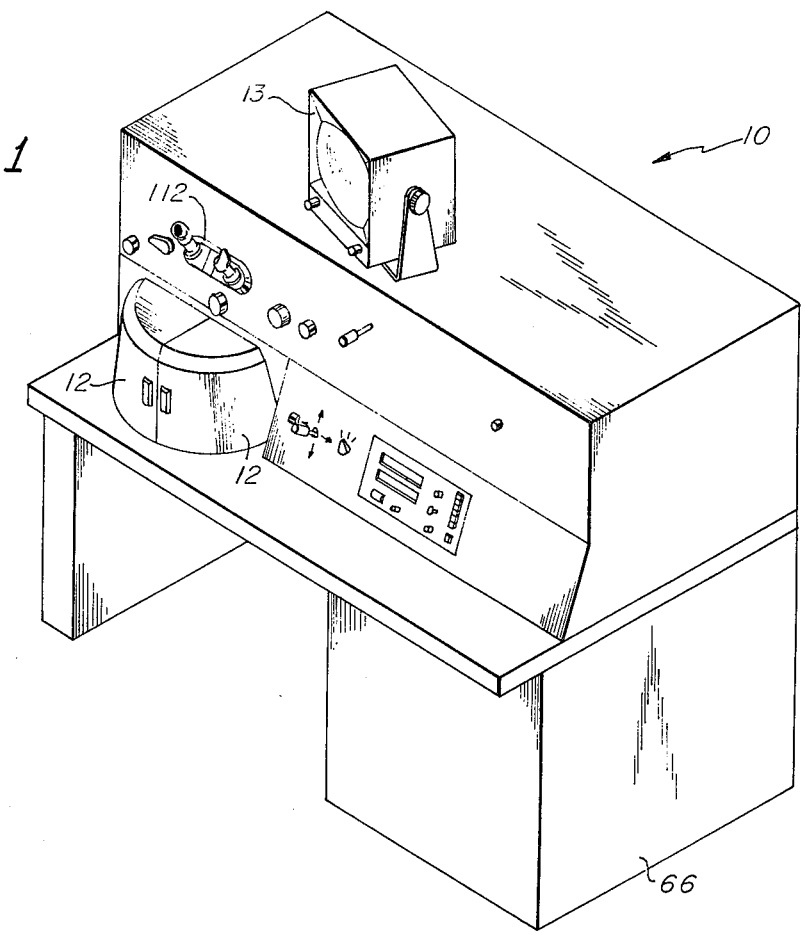
FIG. 1 is an isometric view of a laser material removal apparatus embodying the invention.

Referring more particularly to the drawings wherein like characters of reference designate like parts throughout the several views, a laser apparatus embodying the invention is shown in FIG. 1 and may employ a desk-mounted console 10 which houses the laser and associated optical system and which includes means such as doors 12 whereby operator access to the work is accomplished. A television monitor 13 is adapted to be mounted in suitable viewing position as shown and suitable controls are provided on the front for easy access.

When doors 10 are opened, the operator is enabled to place a workpiece such as a microcircuit device 14 (FIG. 3) on a suitable adjustable support, and when the doors are closed he is enabled to operate a laser to direct a relatively intense beam of coherent electromagnetic radiation onto the workpiece whereupon material will be removed from the surface of the workpiece in the impinged area.

However in conventional pulsed lasers, rods of ruby, YAG or the like are usually utilized as the lasing medium and when optically pumped in the known manner will produce the desired intense beam of radiation which will be emitted from one end of the rod. Since such rods are generally of solid cylindrical shape, the beam will have a generally circular cross-sectional shape, and will have energy density distribution such as shown by curve 16 in FIG. 5. It will be apparent that the energy is considerably more intense in the center of the beam than in marginal portions.

In accordance with this invention, the cross-sectional circular shape of the laser beam is converted to a substantially rectangular configuration without producing any substantial reduction in the total intensity of the radiation, and with improvement in uniformity of radiation density throughout the entire width and thickness of the beam so that at the projected image plane the beam will be of substantially uniform intensity throughout its area.

Figure 2:
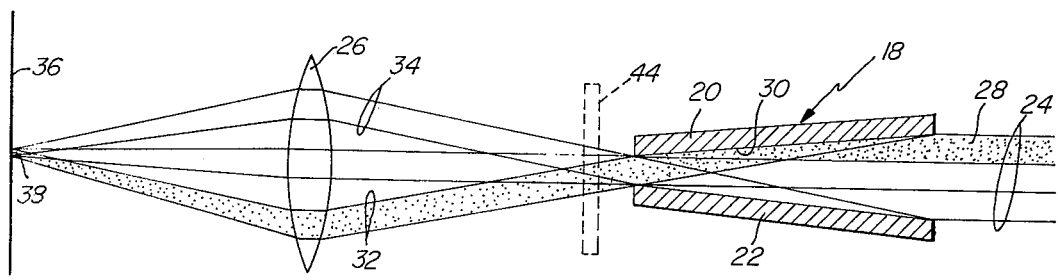
FIG. 2 is a plan view of an optical beam compressor suitable for use with this invention.

Such altering of the cross-sectional shape of the beam is accomplished primarily by an optical compressor 18 (FIG. 2) preferably in the form of a pair of long narrow optical reflectors of plates 20 and 22. The reflectors may be merely glass sheets having relatively smooth reflecting surfaces. The plates 20 and 22 are slightly apart and angled as shown so as to provide a tapered light tunnel through which the laser beam passes. As shown in FIG. 2, the laser beam 24 is directed into the wider end of the compressor and exits from the narrow end, from which it passes through a focusing lens 26 onto an image plane 28 which may be the workpiece 14.

The beam has a circular cross-sectional shape as it enters the compressor 18 and will pass through the compressor and exit from the opposite end as a long narrow quasi rectangle in cross-section. This is due to the fact that opposite side portions of the beam will impinge upon the respective inner angled surfaces of the plates and will be reflected thereby out through the narrow end of the device. This is indicated in FIG. 2 by numeral 28 which refers to the side portion of the beam which contacts surface 30 of plate 20. It will be seen that beam portion 28 will be entirely reflected once and upon emerging from the compressor 18 will become effectively a separate beam 32 which will impinge upon the adjacent surface of the focusing lens 26. Likewise, the opposite side portion of the laser beam 24 will be reflected once by the inner surface of plate 22 and will emerge from the compressor as a third separate beam 34 which will be focused by lens 26 into superimposition with beam 32 and with the central unreflected portion of initial laser beam onto the image plane 36 as a single image 38 having the substantially rectangular shape. Furthermore, since very little, if any, of the initial beam is lost in the compression process, substantially all of the energy of the initial beam remains in the image 38 at the image plane 36.

Referring to FIG. 5, the radiation output from the end of the laser rod appears normally as a curve 16. However, the side portions 40 and 42 during the compression process become superimposed at the image plane upon the central portion, thus increasing the radiation density of the central portion and tending to square off the peak of the central portion of the curve 16.

While it has been mentioned above that the side portions of the laser beam 24 will be reflected once, this is preferable. However, it will be understood that additional reflections may occur, depending upon the optical parameters selected and image size desired. Preferred image width is from 0.001 to 0.002 inches. This size may be varied by symmetrically spreading apart or closing the exit ends of the plates 20 and 22, which is easily accomplished by a micrometer drive and linkage. For this purpose, the entrance ends of the plates may be hinged. Changing size will not affect the total energy content in the beam.

The long dimension of the image spot is typically 0.0063 inches. An adjustable slit 44 is provided adjacent the exit end of the compressor device 18 for the purpose of controlling the exact length of the image spot.

While the compression of the laser beam 24 is performed primarily by the compressor element 18, a beam having a typical beam diameter of 0.250 inches will require a relatively large compressor device 18 for desirable beam size reduction. Accordingly, it is usually desirable to employ additional beam compression means, preferably located between the laser head and the compressor device 18. Such additional means may comprise a pair of prisms 46 and 48 (FIG. 4) which function to initially compress the beam 24 in one direction. Beam 24 will enter the first prism unaltered as shown at 50 but will be compressed when it emerges, as shown at 52, and will be still further compressed when it emerges from the second prism 48, as shown at 54. Thus, only the compressed beam per 54 will pass into the compressor unit 18.

Referring now to the complete system shown in FIG. 2, the pulsed laser 56 which produces the high intensity beam 24 of electromagnetic radiation which is used for the material removal process is typically a ruby crystal or rod 58. The front end of the rod 58 has a surface which is a Fresnel reflection output mirror and its opposite end is anti-reflection coated. A 100% reflecting mirror 60 spaced from the rear end of the rod 58 cooperates with the front surface mirror to produce a resonator, in the well-known operation of a laser of this character. The rod 58 and a parallel Xenon flash pump lamp 62 are disposed on the foci of an elliptical reflector 64 which cooperates with the rod 58 to produce the laser beam 24 in the form of pulses of high intensity radiation at as much as 10 pps. The power supply (not shown) may be housed in desk pedestal 66.

The beam 24 will pass through the compressing prisms 46 and 48 and will be compressed in one direction as discussed in connection with the discussion of FIG. 4. The resultant partially compressed beam 54 then passes through the optical compressor unit 18, as described in connection with the discussion of FIG. 2, whereupon it becomes further compressed, emerging from the unit 18 as three narrow beams which are focused by lens 26 onto an image plane which is the surface of the workpiece 14.

The image of the beam at the image plane is a thin or narrow spot. Although the beam was initially circular in cross-section, the spot has become so thin or narrow that it is unnecessary to provide any means for squaring off the ends of the image which correspond to the uncompressed sides of the beam. In fact, the long dimension of the beam may be controlled by the adjustable slit 44 at the exit end of the compressor unit 18.

Figure 6:
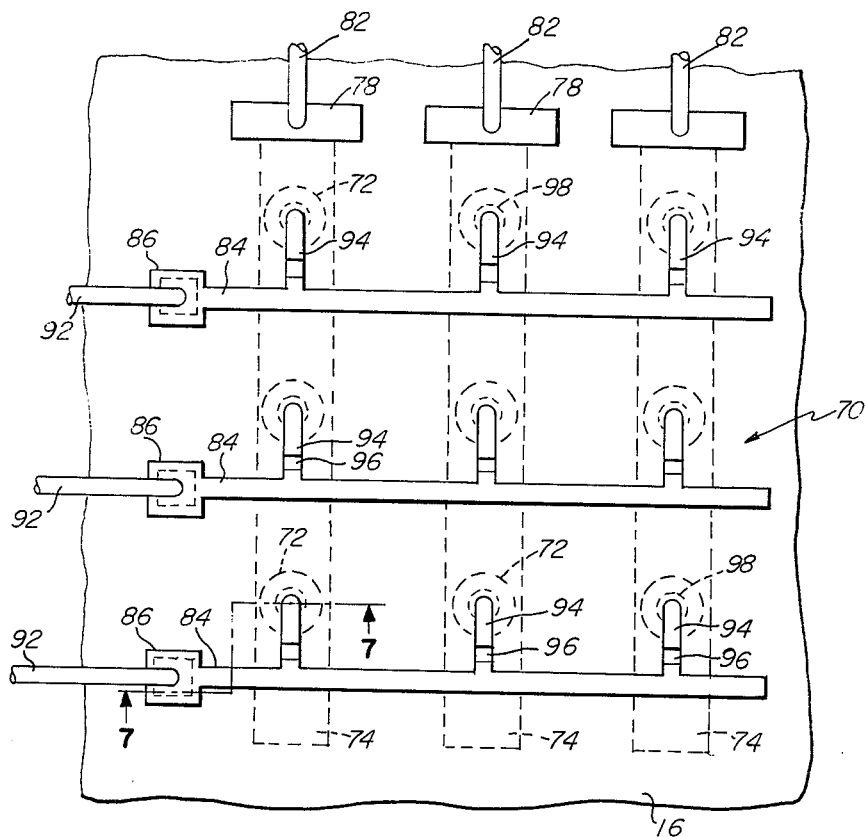
FIG. 6 is a partial elevational view of a memory circuit with which the invention is utilizable.

This invention has been found to be particularly useful in the manufacture of semiconductor devices such as microcircuits where it is often desired to selectively remove a thin layer of material from a substrate. For example, memory devices 70 (FIG. 6) include a number of semiconductor elements such as diodes 72 arranged in an array of rows and columns, as described in U.S. Pat. application Ser. No. 402,495, filed by H. Schilling et al and assigned to the same assignee as this invention. Each diode 72 is an integral portion of an elongated strip 74 of semiconductor material on the surface of a dielectric substrate 76. Strips 74 comprise column connectors for the diodes 72, each strip terminating in a bonding pad 78. Covering each of the strips 74 is a layer 80 of insulating material, and lead wires 82 are connected at one end through holes in layer 44 to respective pads 78.

Crossing the strips 74 and overlying the layer 80 are a plurality of metal strips 84 each of which terminates in a respective bonding pad 86. Each pad 86 comprises a layer 88 of silicon, a covering layer 90 of insulation, and the metal portion 86. Fine wires 92 are connected at one end to respective bonding pads 86.

The metal strips 48 comprise row conductors for each of the diodes 72 and are connected to the diodes by conductors 94 which contain fusible sections 96. These conductors are connected at one end to the strips 84 and at their other end to the P-regions 98 of the diodes 72 through holes in layer 80.

The fusible elements 96 are of a shape, size and composition as will lend to their being "blown" by melting and/or vaporizing when heated. The laser beam is suitable for performing this function, especially when the beam energy is confined and compressed into the small image 38 as described. It will be apparent that a small round image or spot may not always perform satisfactorily because good isolation or rupture may not occur when a small spot is used. When large round spots are formed, there is considerable possibility that the spot may destroy or damage other areas adjacent to the area desired to be removed. Accordingly, a small rectangular spot is highly desirable.

Figure 7:
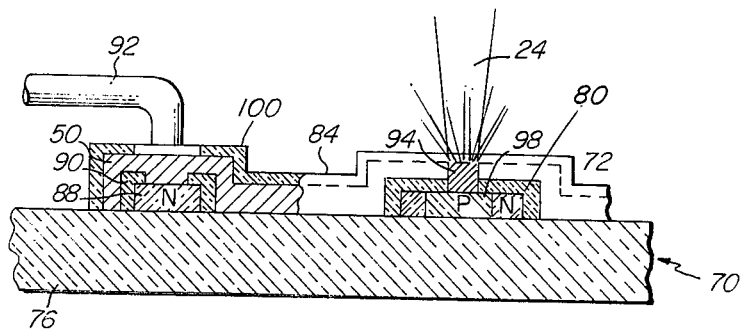
FIG. 7 is a vertical sectional view taken substantially on line 7—7 of FIG. 6.

As shown in FIG. 7, the fusible link 96 is "blown" by directing the compressed laser beam 24 onto the link, whereupon the link will melt and/or vaporize in the area impacted by the beam. Although a layer 100 of silicon dioxide or the like is disposed over the entire structure, the laser beam 24 easily penetrates this layer to reach the metal link. Thus, selected ones of the diodes 72 may be isolated.

It will be apparent that the laser apparatus may be programmed to efficiently blow the selected links in any desired manner.

Referring again to FIG. 3, it will be seen that in initially setting up the apparatus, the workpiece 14 is mounted on a suitable adjustable support such as table 102 which has portions adjustable in X and Y directions as is well known. Height control may also be accomplished in any known manner by manual operation of handle 104.

To visually indicate and observe location of a spot on the workpiece, there is provided a second low power laser 106, which may be of the helium-neon type, for producing a visible spot on the workpiece in the same area where the high power ruby laser beam 24 will impact. Second laser 106 forms a continuous beam 108 which is reflected by a mirror 110 to the prism 46 and thereafter follows the same path as the pulsed beam 24, being compressed and focused so as to form a small substantially rectangular spot on the workpiece.

Visual observation of the spot may be made by the operator through a biocular or other microscope 112 via suitable reflectors 114 and 116 and a perforated flip-in mirror 118 located in the path of the beam at a point after the compressor unit 18.

A television camera 120 may also be disposed in optical alignment with the workpiece 14 by means of suitable mirrors 122 in the optical path of the compressed beam, as shown.

Means for superimposing a reticle (not shown) on the workpiece 14 is also readily achievable with this invention.

It will be apparent that all of the objectives of this invention have been achieved by the novel optical means described for converting a substantially circular laser beam to one which is substantially rectangular (including square) in cross-sectional configuration.

Figure 8:
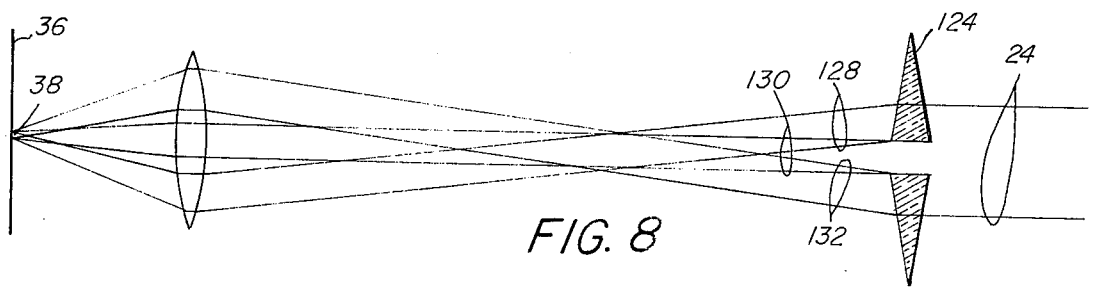
FIG. 8 is a view similar to FIG. 2 illustrating a modification of the beam compressor unit.

It will also be apparent that various modifications and changes in the inventive structures and methods shown and described may be made by those skilled in the art without departing from the spirit of the invention. For example, the compressor unit, instead of angled plates 20 and 22, may be a pair of spaced prisms 124 and 126 as shown in FIG. 8. The incoming uncompressed or partially compressed beam 24 will be split by the prisms 124 and 126 into three component portions 128, 130 and 132 which are superimposed and focused by lens 26 onto the image plane 36 as a single substantially rectangular image or spot 38.

It will be apparent that various other modifications and changes may be made by those skilled in the art. Therefore, all matter shown and described is to be interpreted as illustrative and not in a limiting sense.

We claim:

1. Laser material removal apparatus comprising a laser adapted to produce a beam of radiation having a substantially circular cross-sectional shape and to dissect said beam toward an image plane along an optical asis, and means for forming at said plane a substantially rectangular image of said beam having a fixed predetermined width and a controllable length, said means comprising an optical system located on said axis and including a pair of spaced flat reflecting means disposed on opposite sides of said axis and angled to provide at one end an entrance aperture for the beam and an exit aperture at the opposite end which is smaller than said entrance aperture for superimposing opposite side portions of said beam onto a central portion thereof whereby the beam at the exit aperture is compressed in one direction without being compressed in the perpendicular direction, and slit means adjacent said exit aperture for controlling the size of the beam in said perpendicular direction.

2. In a laser apparatus which provides a beam of electromagnetic radiation having a substantially circular cross-sectional shape, optical means for forming at an image plane an image of said beam having a substantially rectangular shape and containing substantially all of the radiation energy as the beam initially produced by the laser, said optical means comprising a pair of spaced prisms and a focusing lens, said prisms being positioned to intercept a respective opposite side portion of the beam with the remaining portion of the beam being enabled to pass therebetween substantially unattenuated to said lens, said prisms comprising means for separating said opposite side portions of the beam from the remaining portion thereof and directing said side portions separately to said lens, and said lens comprising means for focusing all said portions of the beam to a common spot on said image plane.

3. In a laser apparatus as set forth in claim 2, wherein said prism means is located in the path of said beam for intercepting and partially compressing the beam in one direction, and an optical compressor unit is located in the path of said partially compressed beam for superimposing opposite side portions of the partially compressed beam onto a central portion thereof to form an image wherein all portions are combined.

4. In a laser apparatus as set forth in claim 3, said optical compressor unit comprises a pair of spaced optical elements and a focusing lens, said elements being positioned to each intercept a respective opposite side portion of the partially compressed with the remaining portion thereof being enabled to pass therebetween substantially unattenuated to said lena, said elements comprising means for separating said opposite side portions of the beam from the remaining portion thereof and directing said side portions separately to said lens, and said lens comprising means for focusing all said portions of the beam to a common spot on said image plane.

5. In a laser apparatus as set forth in claim 4, said elements being a pair of spaced angularly disposed reflecting plates.

6. In a laser apparatus as set forth in claim 4, said elements being a pair of spaced prisms.

7. A method of removing a rectangular area from the surface of a microcircuit device comprising locating a pulsed laser so as to direct a beam of radiation having a substantially circular cross-sectional shape along a known path, placing the device on a support and adjusting it to locate the area to be removed in said path, operating said laser to form the beam, and simultaneously optically separating opposite side portions of the beam from the central portion of the beam and superimposing them on said central portion to form a combined image of all portions at said area to be removed by passing opposite side portions of the beam through respective spaced prisms while passing the central portion of the beam unintercepted by the prisms through the space therebetween, and focusing all said portions simultaneously to a common image spot on said surface.

* * * * *